United States Patent Office 3,378,051
Patented Apr. 16, 1968

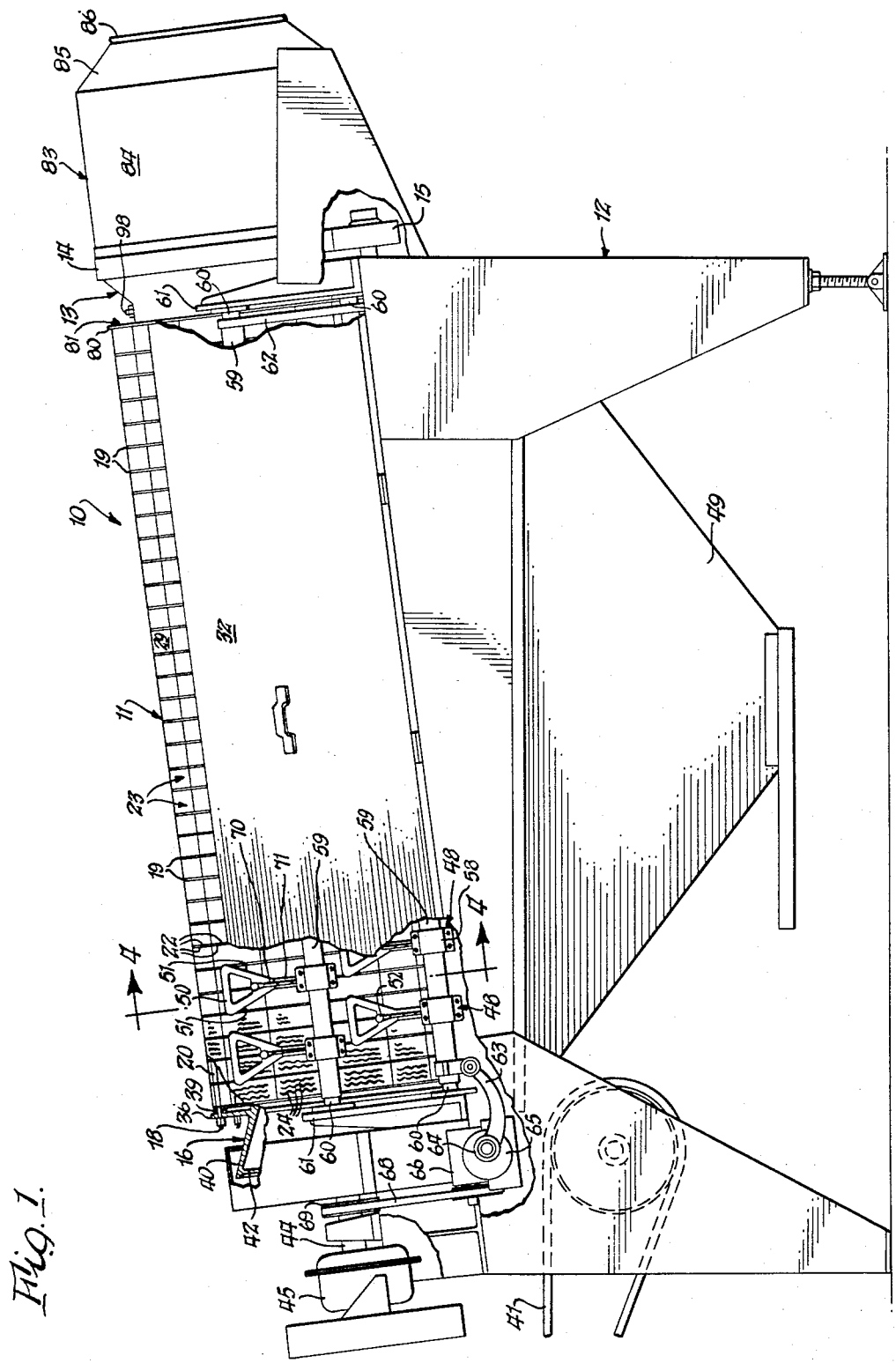

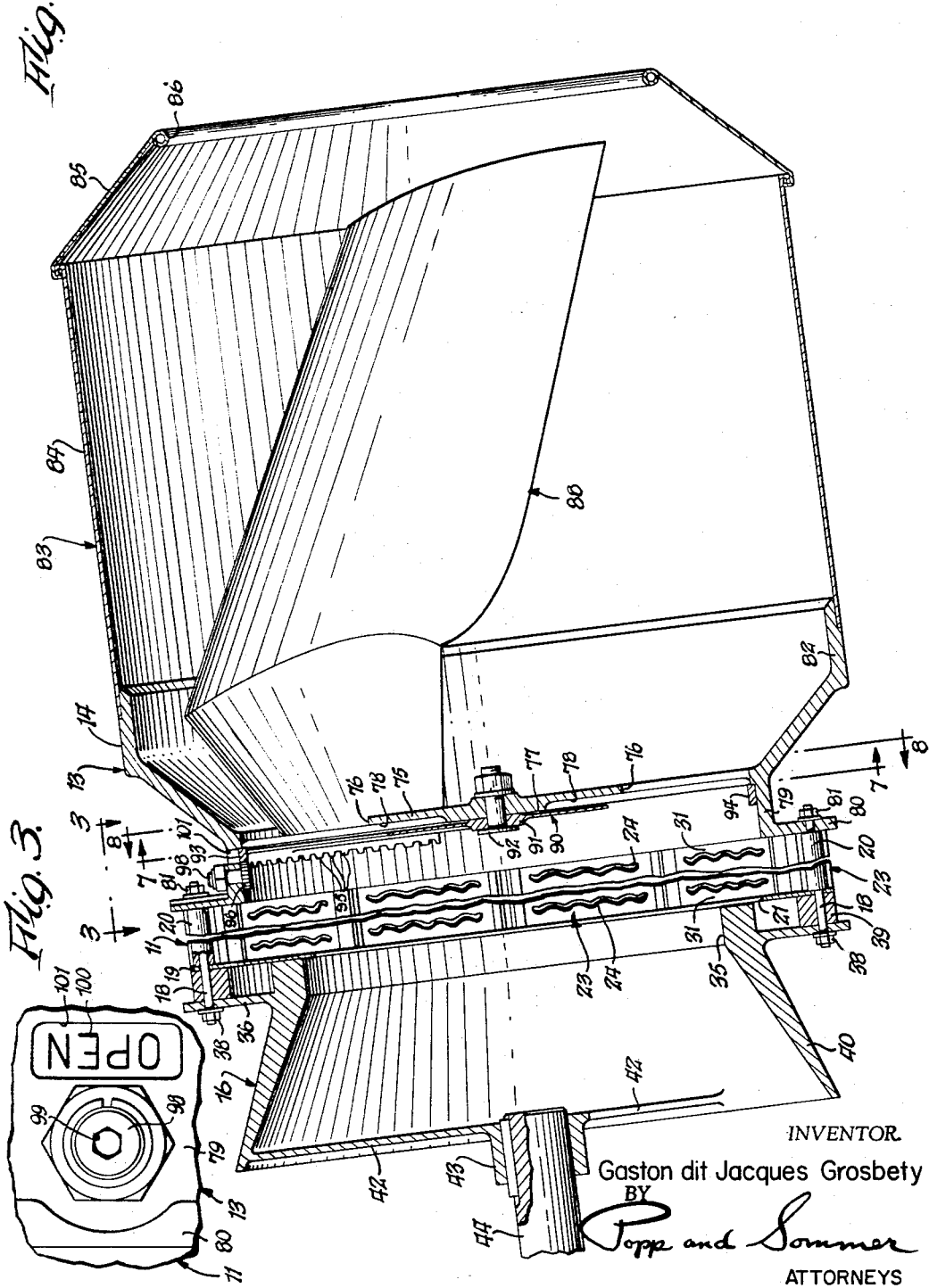

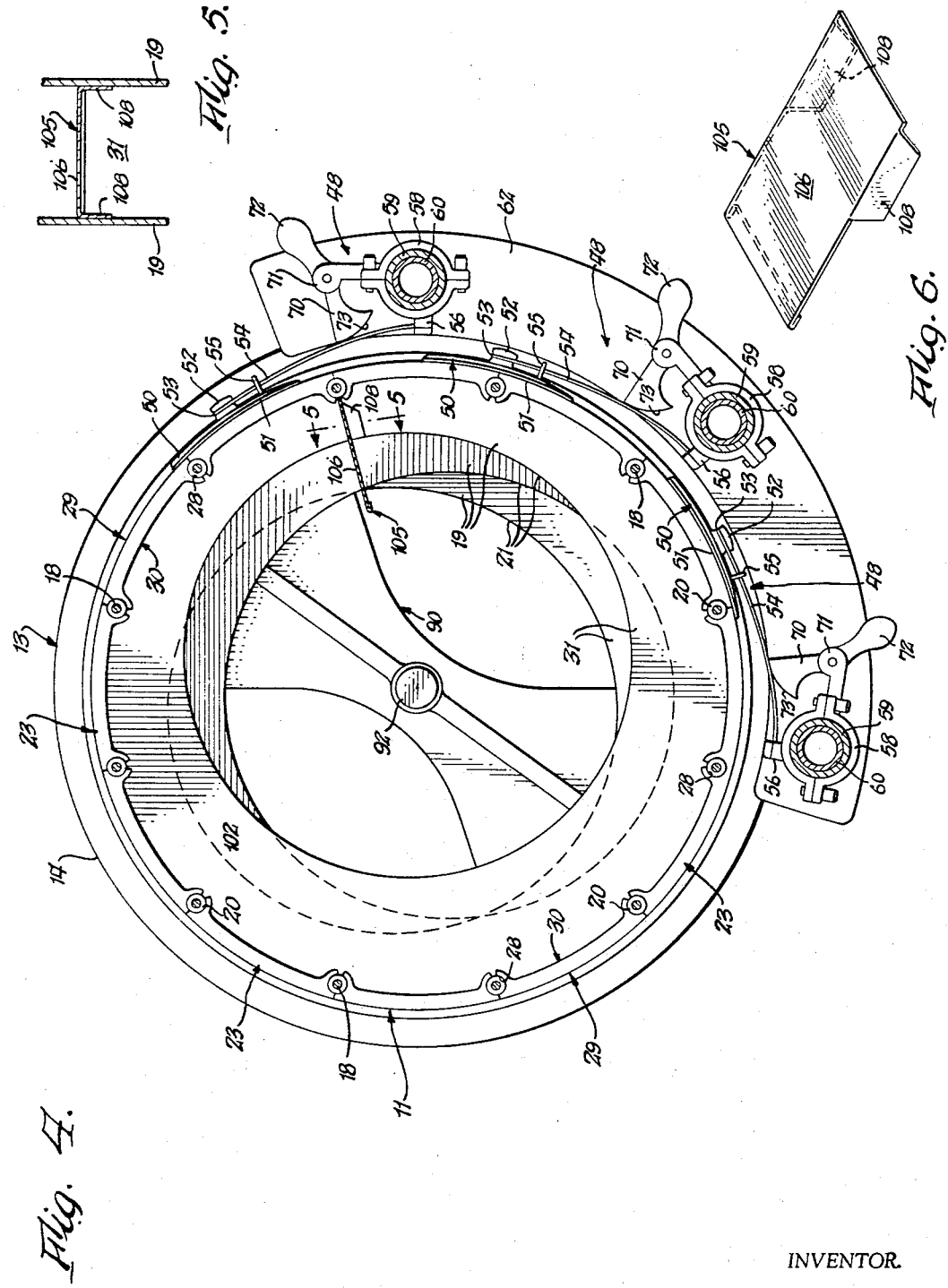

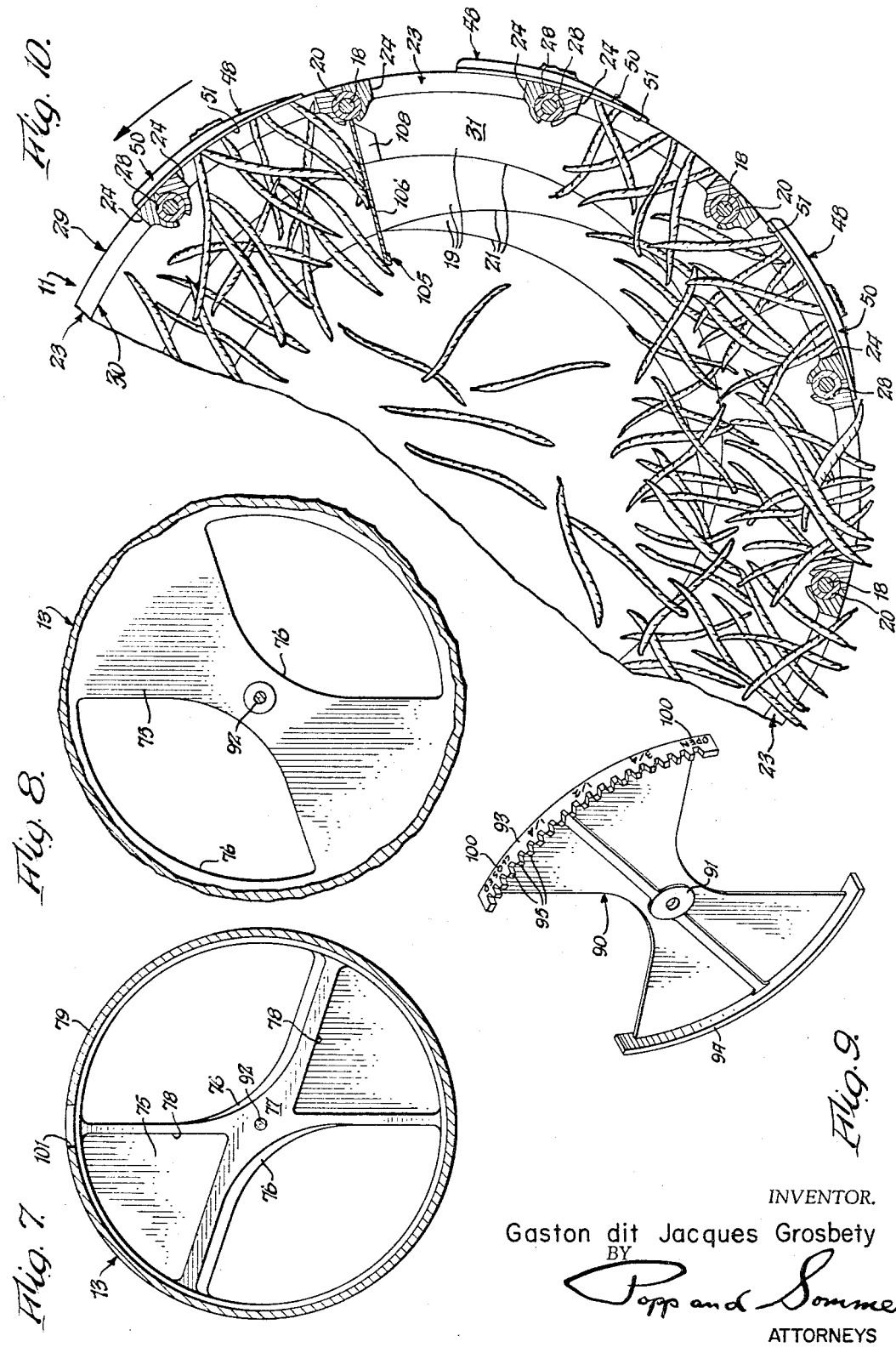

3,378,051
BEAN SNIPPER
Gaston dit Jacques Grosbety, Duvernay, Quebec, Canada, assignor to Chisholm-Ryder Company, Inc., Niagara Falls, N.Y., a corporation of New York
Filed Feb. 21, 1966, Ser. No. 528,880
9 Claims. (Cl. 146—86)

ABSTRACT OF THE DISCLOSURE

The bean snipper is of the general type including a sloped drum with its periphery having a multitude of small apertures which apertured periphery knives are pressed to cut off the bean ends projecting from the small apertures, and internally including axially spaced partitions with openings to permit the beans to flow through the successive compartments formed by the partitions. The present bean snipper is characterized by the large size of these openings to provide increased flow through the snipper; lifting plates in the compartments to work the flow of beans from the bottom to the top of the stream; by an external scoop at the inlet end to facilitate feeding of beans to the machine; and by a shutter to control such feeding of beans to the machine.

---

The United States patent to J. R. Urschel, 2,114,730, dated Apr. 19, 1938, discloses a type of string bean snipper which uses a sloped cylindrical drum having apertures through its peripheral wall, and a plurality of knife blades resiliently arranged against the outside of the wall. As the drum is rotated the ends of the beans therein will fall or extend through the apertures and be cut off by the knife blades. Internally the drum is provided along its length with a plurality of separate, axially spaced apart partition disks extending inwardly from the peripheral wall, these disks severally having openings so that as the drum is turned, the upward movement of the beans in the spaces between each pair of disks permit a portion of the beans in elevated position to drop through the disk opening into the next adjacent lower space thereby to propel the beans processed through the drum.

The present invention represents an improvement on the bean snipper disclosed in this patent, the improvement being increased capacity without sacrifice of bean end snipping efficiency.

It is accordingly the principal object of the present invention to provide such type of bean snipper having greatly increased capacity without sacrifice of bean snipping efficiency. Therefore a canner seeking to enlarge the capacity of his plant does not have to allocate more space for bean snippers.

Another object is to enable such increased capacity to be obtained by means of simple and low cost modifications of the canner's existing bean snippers of this type. Accordingly, a canner seeking to enlarge the capacity of his plant does not require the replacement of expensive equipment but merely the alteration of his existing snippers.

In the accompanying drawings, FIG. 1 is a side elevational view, with parts broken away, of a bean snipper embodying the invention. FIG. 2 is a fragmentary enlarged longitudinal view through the feed end outlet ends of the drum assembly and in particular illustrating the inlet and outlet end heads and the feed hopper thereof. FIG. 3 is a further enlarged fragmentary top plan view, viewed from line 3—3, FIG. 2. FIG. 4 is an enlarged transverse sectional view taken generally on line 4—4, FIG. 1. FIG. 5 is a fragmentary section taken generally on line 5—5, FIG. 4. FIG. 6 is a perspective view of one of the lifting members or plates employed in the drum assembly. FIGS. 7 and 8 are diminutive vertical transverse sectional views taken generally on the correspondingly numbered lines in FIG. 2. FIG. 9 is a perspective view of the valve shutter plate employed to regulate the flow of string beans into the bean snipper. FIG. 10 is a fragmentary enlarged view similar to FIG. 4 but in particular illustrating the manner in which the beans in the stream flowing through the drum assembly are worked from the bottom of the top thereof, and caused to project their small cross section stem or tail ends through the apertures in the peripheral wall of the drum assembly, to be snipped off.

The numeral 10 identifies the subject bean snipper which includes a cylindrical drum assembly 11 rotatably supported with its axis at an angle to the horizontal upon a frame or stand 12, the drum assembly having an elevated circular inlet end head 13 at its upper end, which includes a track 14 riding on a pair of horizontally spaced rollers 15, and a circular outlet end head 16 arranged at the opposite end of the drum assembly and at a lower elevation than the inlet end head 13.

A plurality of rods 18 extend between and connect the rims of these end heads 13, 16, these rods being in uniformly spaced relation about the peripheries of these end heads, and parallel to one another and uniformly spaced from the axis of the end heads so as to be in cylindrical arrangement. These rods support a series of sheet metal partition disks 19 through the rims of which these rods extend and these partition disks are held in uniformly spaced relation to one another in separate generally parallel planes extending transversely of the drum assembly by spacer sleeves 20 on these rods. Central openings 21 are provided through the partition disks 19 in staggered, eccentric or helical relation to one another to assure proper tumbling action of the beans being processed as well as their proper progression through the drum assembly. The resulting structure forms a cylindrical frame having generally rectangular openings 22 of uniform dimension, each of which is adapted to snugly receive a drum segment or block 23 formed of a plastic material, preferably a high impact polystyrene.

Each segment or block 23 has a plurality of apertures 24 in the form of elongated openings of wavy or substantially zig-zag configuration, and of generally uniform width or cross section, these apertures being arranged in groups in each segment. Each segment or block 23 has an arcuate profile, that is, is curved to conform to the peripheral outline of the end heads 13 and 16 and partition disks 19, and has at each end a transverse semicircular slot 28, of substantially the same radius as that of the spacer sleeves 20. Each segment or block 23 is held in position within its opening 22 by engagement of the end slots 28 with adjacent spacer sleeves 20. To insert each segment or block 23 into such position, it is only necessary to place one end slot 28 into engagement with a spacer sleeve 20 and bend the segment until the other end slot 28 can be snapped into engagement with the opposite spacer sleeve. Such bending will temporarily reduce the dimension between the end slots 28 so that it is less than the minimum dimension between adjacent spacer sleeves 20, whereby the segment can be snapped into position. To remove a segment or block 23 from an opening 22, it is only necessary to insert a hook (not shown) in one of the apertures 24, and pull outwardly after the hook is engaged. The inherent resiliency of the plastic material from which the segment is fabricated allows a certain amount of bending without rupture, thus making possible the easy insertion or removal of a segment or block 23 from an opening 22. The array of segments or blocks 23, in effect, forms a peripheral wall for the cylinder assembly the external peripheral surface of which is indicated generally at 29 and the internal surface of which is indicated at 30, this internal surface forming the interior of the drum from which surface 30 the partition disks 19 project inwardly and form annular bean pockets 31 within the drum assembly. These annular bean pockets 31 are preferably of a width, axially of the drum assembly, less than the average length of the beans being processed and the depth of these bean pockets is determined by the openings 21 in the partition disks 19. Shields 32, coextensive with the drum assembly 11, can be arranged along each side thereof.

The lower end head 16, as best shown in FIG. 2, includes a cylindrical throat 35 the opening through which is held generally in register with the opening 21 of the adjacent partition disk 19 by means of an integral circular outwardly projecting flange 36 through which the rods 18 extend and are secured by nuts 38 on the threaded ends of these rods, a spacer ring 39 being preferably interposed between the rims of this end partition disk 19 and the flange 36. Beyond the throat 35 the end head 16 is of outwardly flaring funnel shape, as indicated at 40, to direct beans flowing therethrough onto a horizontal conveyor belt 41 of any suitable form. An integral spider 42 extends across the enlarged outlet end of the funnel shaped portion 40 of the end head 16 and supports a hub 43 in which is fixed a stub drive shaft 44. This drive shaft is the output shaft of motor driven reducing gearing (not shown) in a reducing gear housing 45.

A stream of beans is admitted through the elevated inlet end head 13 in a manner hereinafter described and is moved along within the drum assembly 11 and the ends of the beans are caused to enter the apertures 24 in random manner and project therefrom as shown in FIG. 10.

A plurality of knife blade assemblies 48 are maintained in sliding contact with the outer peripheral drum surface 29 formed by the segments or blocks 23, and are adapted to shear or cut off the ends of the beans which project through the apertures 24 beyond this external peripheral surface 29. These cut off ends fall into a hopper 49 held by the stand 12, while the cut beans pass out of the drum assembly by way of the throat 35 and funnel shaped portion 40 of the outlet end head 16 onto the conveyor 41 as previously described.

The structure and mounting of the knife blade assemblies 48 form no part of the present invention and each is conventionally shown as having a head 50 which is triangular in form with two cutting edges 51 angularly disposed and arranged for simultaneously passing over a plurality of the apertures 24 as the drum assembly 11 rotates. Each knife blade head 50 has a stud 52 projecting outwardly from adjacent its center, such projection being generally radial with reference to the drum assembly 11. To this stud is secured the apertured head 53 of a resilient knife rod 54, this rod extending downwardly from its stud 52 through an apertured ear 55 which serves to hold the knife blade upright when it is withdrawn from the peripheral surface 30 of the drum assembly 11. The lower end of each resilient knife rod 54 is fixed to a boss 56 on a split clamping ring 58, the two halves of which embrace and are clamped to one of a series of tubes 59 severally slidingly mounted on rods 60 arranged in circumferentially spaced relation to one another parallel with the axis of the drum assembly 11 along the lower part of the rising side thereof. The opposite ends of the rods 60 are fixed to crescent shaped holders 61 which form part of the frame or stand 12 of the bean snipper.

The sliding tubes 59 are reciprocated lengthwise of their supporting rods 60 and to this end they are connected together, at the inlet end of the bean snipper, by a C-shaped bar 62, and at the opposite end of the bean snipper the central sliding tube 59 pivotally connects with the end of a connecting rod or pitman 63 the opposite hub end 64 of which fits an eccentric 65 on the output shaft of gearing within a gear box 66 driven by a belt 68 from a pulley 69 on the stub drive shaft 44 of the drum assembly 11.

The knives are mounted on the sliding tubes 59 so that the circumferential areas which they serve overlap so that any bean end which finds its way through an aperture 24 at the bottom of the drum will be sliced off by one of the knives heads 50. As best seen in FIG. 4, to press each knife blade against the external peripheral surface 29 of the drum a manual cam lever 70 is pivotally mounted on a riser 71 projecting upwardly from each split ring 58, this lever having a finger piece 72 at one end, and a cam face 73 at its opposite end, the latter engaging the center of the knife rod 54 to bow it toward the drum assembly 11.

The inlet head 13, as best shown in FIGS. 2, 7 and 8, comprises an integral disk 75 having a pair of symmetrical, diametrically opposite valve openings or passages 76 of pointed elliptical shape, leaving a central face area 77 of hourglass form concentric with the axis of the disk 75 and facing the interior of the drum assembly 11, this area preferably being relieved by the depressions 78 shown. The disk 75 is provided with an integral cylindrical rim 79 terminating at one end in a radially outwardly projecting integral flange 80 through which the adjacent ends of the rods 18 extend and are secured by nuts 81. The end of the cylindrical rim 79 opposite the flange 80 is continued in the form of an enlarged frustoconical or funnel-shaped enlargement the outer large end 82 of which supports one end of an inlet hopper indicated generally at 83. This inlet hopper is in the form of a cylindrical sheet metal shell 84 having a diminishing frusto-conical end head 85 providing an inlet opening 86 through which the beans to be snipped are fed into the bean snipper.

In order to maintain optimum maximum flow of the beans through the bean snipper the inlet hopper 83 is internally provided with a pair of scoops 88, one being shown in FIG. 2. These scoops can be of any suitable form and are disposed helically with reference to the axis of the inlet hopper with their outlet ends directed toward the openings 76 in the disk 75 of the inlet end head 13 so that the hopper rotates an excess of beans to be processed is brought to these openings by the scoops to be permitted to pass therethrough to the extent permitted by the position of the valve shutter plate 90 which adjusts the effective size of these openings as hereinafter described.

A feature of the invention resides in so controlling the flow of beans into the drum assembly 11 so that the bean snipper will not be called upon to handle more than an optimum flow of beans therethrough. Without such valve control means, a greater than optimum feed of beans into the bean snipper could occur, with the result that substantially all of the beans would not necessarily be positioned to have both ends projected through the apertures 24 to be sliced off by the knives 50. To effect such control of the flow of beans the shutter plate 90 is provided which is of hourglass form in configuration, conforming to the shape of the face area 77 of the plate 75 and having a concentric hub 91 engaging the center of the plate 75 and pivotally secured thereto by means of a pivot pin or bolt 92 of any suitable form.

The shutter plate 90 has concentric arcuate rims 93 and 94 at its opposite ends which are arranged in closely spaced relation to the cylindrical portion 79 of the inlet head 13 and the upper one of which is provided with gear teeth 95 so as to be in the form of an arcuate rack. These teeth are engaged by a small pinion 96 fixed to the end of an adjusting shaft 98 which is journalled radially in the cylindrical part 79 of the end head 13 at the top thereof. This shaft 98 projects to the exterior of the bean snipper and is provided with an out-of-round socket 99 adapted to receive an adjusting wrench (not shown) to turn the pinion 96 and move the arcuate rack 93 of the shutter plate 90 so as to move this shutter plate to cover greater or less parts of the inlet passages 76 in the inlet head 13. Preferably this gear rack 93 also has, on its periphery indicia 100, such as "open," "close," "¼" etc. which indicia are successively visible through a window 101 in the top of the end head 13 so that the person making the adjustment can see to what degree of open or closed position the shutter plate 90 has been turned.

An important feature of the invention resides in the large size of the openings 21 in the partition disks 19 and which openings, as previously described, are helically arranged with reference to one another. In bean snippers of this type heretofore in use the area of each of these openings has been approximately one-quarter of the face area 102, in the drum, of the disk 19 surrounding the opening. With such small openings, the flow of beans through the bean snipper was reduced as compared with the flow of beans through the present bean snipper where the area of each of these openings 21 is at least half, and preferably equal to, the face area 102, in the drum, of the disk 19, surrounding the opening 21. These openings 21 can be circular, square or of other form and are of equal area and are helically arranged to provide the desired transfer of a large proportion of the beans from each bean pocket 31 between each pair of partition disks 19 into the next succeeding lower bean pocket 31 as the drum rotates.

A further important feature of the invention resides in the provision of a means working the beans from the bottom to the top of the stream flowing through the drum assembly 11, such means comprising lifting members 105 in certain of the bean pockets 31 between the pairs of partition disks 19, these lifting members being fixed to rotate with the drum assembly 11 and acting to lift the beans at the bottom of the stream to a higher elevation than the beans at the top of the stream and to drop them back on top of the stream so that all of the beans are worked from the bottom to the top of the stream to insure both ends of each bean being projected into the apertures 24. Preferably such lifting members 105 are each in the form of a plate 106 arranged, starting in the sixth bean pocket 31, from the inlet of the machine and also arranged in every third bean pocket 31 thereafter, the intermediate bean pockets 31 and the first five bean pockets 31 being unprovided with lifting plates. Each of these lifting plates is in the form of a flat plate having flanges 108 projecting laterally from opposite edges thereof and arranged in face-to-face relation with the pair of partition disks 19 between which it is interposed. These flanges can be soldered or otherwise suitably secured to these partition disks so that the lifting plate is in a plane perpendicular to the partition disks and projects toward the center of the drum assembly. Preferably these lifting plates are also arranged on the sides of the adjacent openings 21 which are closer to the internal surface 30 of the drum assembly.

In the operation of the bean snipper the beans to be snipped are fed through the opening 86 into the hopper 83 which is rotating with the drum assembly 11 so that its scoops 88 pick up these beans and slide them toward the two passages 76 in the plate 75 which is integral with the end head 13. The effective size of these passages 76 is adjusted by the position of the shutter plate 90 which can be adjusted about its pivot pin 92 to block off a greater or lesser amount of the areas of these inlet passages 76. This is done by turning, by means of a wrench, the stem 98 journalled at the top of the inlet head 13, this turning the pinion 96 so as to move the arcuate gear rack 93 at one end of the hourglass shutter plate 90 and thereby move this hourglass plate 90 to different angular positions with reference to the inlet passages 76 in the inlet head 13. The adjustment of this shutter plate 90 is important in preventing the snipper from attempting to handle a greater flow of beans than is possible with insurance of snipping off both ends of substantially all of the beans passing through the bean snipper. In performing such snipping, by reason of the circular bean pockets 31 formed by the partition disks 19, the mass of beans, when fed through the inlet head 13 are passed into the first bean pockets 31 and will be wedged in mass-like formation therein. Due to the wedging of the beans in these bean pockets they will be carried upwardly in mass formation as the drum assembly rotates, as best shown in FIG. 10. As they approach the top of the drum assembly the beans will drop again to the bottom of the pockets due to the tilt of the drum assembly, a part of the beans from each pocket will drop through the next lower opening 21 into the next succeeding lower bean pocket 31. Due to the fact that in the present bean snipper these openings 21 are exceptionally large, having an area at least half, and preferably equal to, the face area 102, in the drum, of the disk 19 surrounding the opening 21, this percentage of the beans so flowing from pocket to pocket is large, thereby to increase the capacity of the bean snipper.

However with such increased flow of beans permitted by these exceptionally large openings 21, it is necessary to constantly work the stream of beans passing through the drum assembly 11 from the bottom to the top so that the opposite ends of each bean will find its way into an aperture 24 of the peripheral wall of the drum assembly 11 provided by the many plastic blocks or segments 23. This working of the stream of beans from the bottom to the top is effected by the lifting plates 105 the first of which is arranged in the sixth bean pocket 31 from the inlet head 13 and a similar lifting plate 105 being arranged in every third bean pocket 31 thereafter. These lifting plates, as best shown in FIG. 10, act to lift the beans at the bottom of the stream flowing through the drum assembly to a higher elevation than the beans at the top of the stream thereby to remove those beans which are likely to have had one end snipped from adjacent the internal surface 30 of the drum assembly 11 and make room for an unsnipped bean.

Substantially all of the stem and tail ends of each bean passing through the drum assembly will find its way into one of the apertures 24 to be severed by the knife 50 sliding over the exterior face 29 of the drum assembly 11. In actual practice by increasing the size of the openings 21 as indicated, and by the use of the lifting plates 105 to work the beans from the bottom to the top of the stream passing through the drum assembly 11, and by adjusting the shutter 90 so that the flow of beans cannot exceed an optimum maximum, it has been found possible to provide a flow of beans through the same size of bean snipper in ¾ of a minute as compared with 2½ minutes through a similar bean snipper having smaller openings 21, no lift plates 105 and no control shutter 90.

It will therefore be seen that the bean snipper accomplishes the objects and has the advantages initially set forth.

I claim:

1. A bean snipper comprising a rotary drum having inlet and outlet end heads and having a plurality of separate, axially spaced apart partition disks extending inwardly from the peripheral wall of the drum, said partition disks being arranged in separate generally parallel planes extending transversely of the axis of the drum and said disks extending substantially along the length of the drum and severally having openings of substantially equal area with the area of each of said openings being at least half of the face area, in the drum, of the disk surrounding the opening, means supporting said drum with its axis at an angle to the horizontal and its inlet end head at a higher elevation than said outlet end head, said inlet and outlet end heads having inlet and outlet passages, respectively, for a stream of string beans entering and leaving the drum, means for turning said drum about its axis to cause upward movement of the stream of beans in the space between each pair of disks thereby to permit a portion of the beans in elevated position to drop through the disk opening into the next adjacent lower space and thereby propel the stream of beans through the drum, said peripheral wall being provided with a plurality of through apertures through which the ends of the beans can project, means for snipping off the ends of the beans which project through said plurality of apertures, and means working the beans from the bottom to the top of said stream at intervals along said drum, comprising lifting members in certain of said spaces fixed to rotate with said drum and acting to lift the beans at the bottom of said stream to a higher elevation than the beans at the top of said stream.

2. A bean snipper as set forth in claim 1 wherein the area of each of said openings is approximately equal to said face area, in the drum, of the disk surrounding the opening.

3. A bean snipper as set forth in claim 1 wherein each of said lifting members comprises a plate arranged to bridge the corresponding space and arranged in a plane projecting toward the center of the drum.

4. A bean snipper as set forth in claim 3 wherein each of said plates is so fixed to rotate with said drum by attachment means securing it directly to at least one of the adjacent disks.

5. A bean snipper as set forth in claim 1 additionally including valve means adjustable to regulate the flow of said stream of beans into said drum through said inlet head.

6. A bean snipper as set forth in claim 5 additionally including at least one scoop rotating with said drum and positioned exteriorly of and to propel beans to said valve means in response to the rotation of said drum.

7. A bean snipper as set forth in claim 1 wherein said inlet head has a pair of said inlet passages in circumferentially spaced arrangement, and additionally includes a shutter movable to cover greater or lesser parts of said inlet passages.

8. A bean snipper as set forth in claim 7 wherein said shutter comprises a plate rotatably secured to one face of said inlet end head to rotate about an axis generally concentric therewith and having openings adapted to be brought into greater or less degree of register with said inlet passages in said inlet end head, and wherein means are provided for fixing said shutter plate in any desired adjusted position with reference to said end head.

9. A bean snipper as set forth in claim 8 additionally including a pair of scoops rotating with said drum and positioned exteriorly of said shutter plate and inlet end head to propel beans to the openings and passages therein in response to the rotation of said drum.

References Cited

UNITED STATES PATENTS

| | | | |
|---|---|---|---|
| 2,393,461 | 1/1946 | Finley | 146—86 |
| 3,010,498 | 11/1961 | Carlson | 146—86 |
| 3,304,974 | 2/1967 | Urschel | 146—86 |

W. GRAYDON ABERCROMBIE, *Primary Examiner.*